United States Patent [19]

Peduto et al.

[11] 3,719,838

[45] March 6, 1973

[54] TEMPERATURE COMPENSATING DIGITAL SYSTEM FOR ELECTROMECHANICAL RESONATORS

[75] Inventors: Ralph Peduto, Locust Valley, N.Y.; Jan Willem L. Prak, Hackensack, N.J.

[73] Assignee: Bulova Watch Company, Inc., New York, N.Y.

[22] Filed: Aug. 2, 1971

[21] Appl. No.: 168,136

[52] U.S. Cl. ................310/8.1, 331/116 R, 331/176, 334/15

[51] Int. Cl. ..............................................H01v 7/00

[58] Field of Search...310/8, 8.1; 334/15; 331/116 R, 331/176

[56] References Cited

UNITED STATES PATENTS

| | | | |
|---|---|---|---|
| 3,531,739 | 9/1970 | Groves | 331/116 R |
| 3,495,195 | 2/1970 | Ribour | 334/15 |
| 3,454,903 | 7/1969 | Page | 331/116 R |
| 3,397,367 | 8/1968 | Steel et al. | 331/176 X |
| 3,404,297 | 10/1968 | Fewings et al. | 334/15 X |

*Primary Examiner*—J. D. Miller
*Assistant Examiner*—Mark O. Budd
*Attorney*—Michael Ebert

[57] ABSTRACT

A temperature-compensating system for piezoelectric crystal oscillators and other electromechanical resonators whose operating frequency varies as a function of ambient temperature. The system includes a temperature transducer for producing an analog measuring signal as a function of temperature within the temperature range of interest, which analog signal is converted into a corresponding binary number. The number is applied as an input to a logical function generator programmed to produce for each input number, an output binary number whose value depends on the generated function. The output number is converted to an analog control signal which is applied to a responsive element coupled to the resonator to vary the operating frequency thereof. The arrangement is such that the curve of the frequency shift due to the analog control signal, inversely matches the frequency-temperature curve of the resonator to effect exact frequency compensation therefor.

14 Claims, 9 Drawing Figures

INVENTORS
RALPH PEDUTO
JAN WILLEM L. PRAK
BY
ATTORNEY

INVENTORS
RALPH PEDUTO
JAN WILLEM L. PRAK
BY [signature]
ATTORNEY

TEMPERATURE COMPENSATING DIGITAL SYSTEM FOR ELECTROMECHANICAL RESONATORS

BACKGROUND OF THE INVENTION

This invention relates generally to temperature-sensitive electromechanical resonators, such as piezoelectric crystals, and other electromechanical resonators whose operating frequency varies as a function of temperature, and in particular to a digital temperature-compensating system for such resonators.

Piezoelectric crystal resonators are widely employed in electronic equipment, the most common use being as a high-Q frequency standard or frequency control element in radio transmitters. Use is also made of crystal resonators as a time base for precision timepieces in watch or clock form. In this instance, the crystal frequency is divided down to provide timing pulses for actuating time indicators or electronic display devices.

The operating frequency of a crystal is determined by its geometry, but this frequency is also affected by temperature. The frequency of a piezoelectric crystal for a given size and cut depends on ambient temperature. In those situations in which the resonant frequency of a temperature-sensitive crystal must be maintained within an extremely close tolerance in an environment subject to temperature variations, one must provide means to counteract the effect of temperature on frequency. We shall now consider several established techniques for this purpose.

One well known technique for minimizing the sensitivity of a crystal to temperature variations, is to control the angle at which the crystal is cut with respect to its crystallographic axes, for the temperature coefficient of a crystal is a function of the angle of cut. However, the degree to which the temperature coefficient may be reduced in this manner is quite limited, in that the range of temperature over which this approach is effective, is relatively small. Hence in a crystal-controlled timepiece which is intended for an environment subject to a broad range of temperature variations, one cannot depend on the cut of the crystal to avoid unacceptable changes in timing as a result of temperature changes.

A second technique for stabilizing the frequency of a crystal is to maintain the ambient temperature to which the crystal is exposed at a constant level in a temperature-controlled oven. This approach is feasible in a conventional, full-scale radio transmitter, but is out of the question in those situations where space is at a premium and where only limited power is available.

Temperature-controlled ovens for crystals require substantial power for energizing their heaters. The necessary power for such ovens is not available in portable radio equipment nor in timing devices employing batteries as the power source. Indeed, the amount of power for operating a crystal oven may greatly exceed that required to energize the associated electronic circuits.

A third technique for frequency stabilization is purely electronic in character and is predicated on the fact that the resonant frequency of a crystal may be varied by varying the magnitude of an external reactance connected in circuit with the crystal. Thus in U.S. Pat. No. 3,404,297, a temperature control circuit is provided for a crystal-controlled oscillator in which the crystal has an arched frequency-temperature characteristic. A temperature-varying control voltage is generated by two potentiometers, each including a thermistor in series with a resistance, and a circuit which combines the output voltage from across the thermistor of one potentiometer with that across the resistor of the other potentiometer to produce a control voltage which is arched in the opposite sense to the arched characteristic of the crystal. This control voltage is applied to a variable capacitance diode in circuit with the crystal to correct the frequency thereof in a manner compensating for temperature variations.

In a temperature-compensating system of this type which includes means adapted to change the crystal frequency in an equal and opposite sense to the frequency change produced by variations in ambient temperature, compensation is fully effective only if one can produce a curve which inversely matches the temperature-frequency curve of the crystal. But the crystal temperature-frequency characteristic of crystals is not linear, nor is the slope or sign of the slope (the direction of the frequency changes with temperature) the same over the entire temperature range. Crystal temperature-frequency characteristics are, in fact, relatively complex curves. As a consequence, it has not heretofore been possible, using known state-of-the-art analog temperature-compensating systems, to provide accurate temperature compensation for such crystals, particularly where voltage power input and volume is severely restricted, as in the case of electronic wrist watches and other miniature devices.

SUMMARY OF THE INVENTION

In view of the foregoing, it is the main object of this invention to provide an improved temperature-compensating system for an electromechanical resonator whose operating frequency is sensitive to changes in ambient temperature, the system being based on a digital technique.

More specifically it is an object of this invention to provide a system of the above type which is continuously effective throughout a broad temperature range to bring about a shift in the operating frequency of the resonator, which shift precisely balances out the shift resulting from a change in temperature, whereby the operating frequency of the resonator is stabilized.

Among the significant features of the invention are that the system may be employed in conjunction with electromechanical resonators in highly compact devices, such as watches and other miniaturized timing devices energized by small batteries, and that the system may be employed with various forms of resonators having distinctly different and complex frequency-temperature curves.

Briefly stated, these objects are accomplished in a temperature-compensating system for a resonator, which system includes a temperature sensor or transducer adapted to generate an analog measuring signal as a function of temperature in the range of interest. The analog measuring signal is converted to a corresponding digital value to produce an input number which is applied to a logical function generator producing an output number that is a well-defined function of the input number.

In one embodiment of the invention, the output number is converted into an analog control voltage corresponding thereto. The control voltage is applied to a voltage-responsive element operating in conjunction with the resonator to vary the frequency thereof in a direction and to an extent compensating for the effect of ambient temperature on the resonator, the arrangement being such that the curve of the frequency shift due to the analog control voltage as a function of temperature, inversely matches the frequency-temperature curve of the resonator.

In other embodiments of the invention, the output number yielded by the logical function generator acts selectively to switch into the oscillator circuit, reactances whose values are such as to effect the desired correction in the operating frequency thereof.

OUTLINE OF THE DRAWING

For a better understanding of the invention as well as other objects and further features thereof, reference is made to the following detailed description to be read in conjunction with the accompanying drawing, wherein.

DESCRIPTION OF THE INVENTION

Temperature variations alter the mechanical resonance frequency of a crystal through their influence on the density, linear dimensions, and the moduli of elasticity of the crystal. Inasmuch as some of the elastic constants of a crystal are positive, while others are negative, the temperature coefficient of frequency may be either positive or negative or zero over various temperature ranges according to the mode of operation, the orientation of the crystal plate, and the shape of the plate.

For example, the commonly used "AT" cut crystal has a cubic temperature-frequency characteristic. Over one range of frequency, the change in frequency increases with temperature, i.e., the temperature-frequency curve has a positive slope. As the temperature increases beyond the first range, the frequency begins to decrease with increasing temperature (i.e., a negative slope to the frequency-temperature curve) and at yet higher temperatures, the frequency again increases with increases in temperature (i.e., a positive slope to the frequency-temperature characteristic ).

Figure 1:
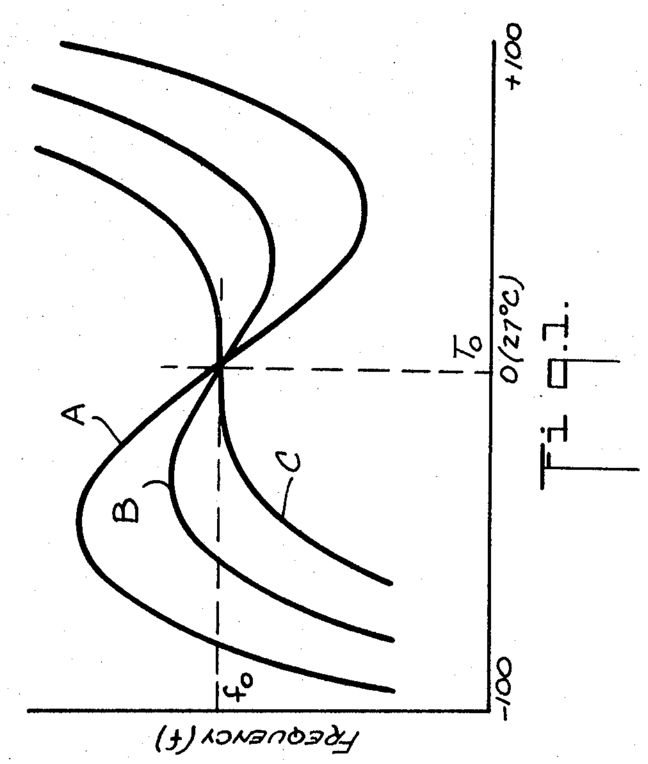
FIG. 1 is a family of frequency-temperature curves depicting the typical performance of AT-cut piezoelectric crystal resonators for various angles of cut with respect to the crystallographic axis thereof.

Referring now to FIG. 1, a family of frequency-temperature curves for an AT-cut quartz crystal is shown. The curves are approximately symmetrical about the point with co-ordinates $f_o$ , $T_o$, where $f_0$ is the frequency of the crystal at the inflection temperature $T_o$. The frequency $f$ can be expressed by the cubic equation $$f=f_o\,[\,1+a_1\,(T-T_o)+a_2\,(T-T_o)^2+a_3\,(T-T_o)^3\,]$$

where:

$T$ is the working temperature; and $a_1$, $a_2$ and $a_3$ are parameters which are characteristics of the crystal unit and are determined largely by the physical properties of the quartz itself.

For a given crystal unit design, the different curves A, B and C shown in FIG. 1, are obtained by slightly changing the angle at which the crystal element is cut from the quartz crystal.

Figure 3:
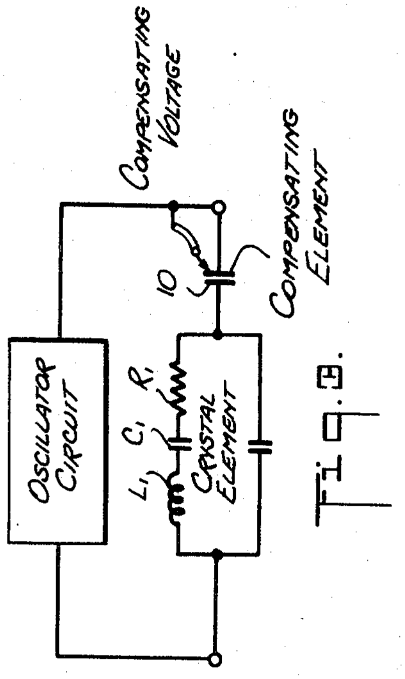
FIG. 3 is the equivalent circuit of the resonator and of the associated voltage-responsive frequency-shifting element.

The equivalent circuit diagram of a piezoelectric crystal is shown in FIG. 3 and comprises inductance $L_1$, capacitance $C_1$ and resistance $R_1$ connected in series and shunted by capacitance $C_o$. The series reactance 10 is the thermo-compensating element necessary to keep the frequency at the prescribed value as the temperature changes. The reactance 10 is preferably in the form of a voltage variable capacitance diode (VVCD) of the type disclosed in U.S. Pat. No. 3,176,244.

Figure 2:
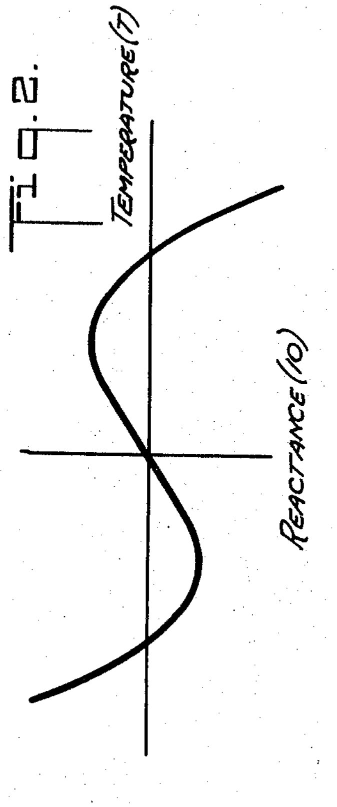
FIG. 2 is a reactance-temperature curve suitable for balancing out the effect of temperature on said resonator with respect to one of said frequency-temperature curves in the family thereof.

It will be apparent from an examination of FIGS. 1 and 2, that if the reactance introduced by the VVCD diode 10 can be made such as to follow the curve shown in FIG. 2, then it will compensate perfectly for the inversely matching frequency-temperature crystal curve shown in FIG. 1. The manner in which this is accomplished in accordance with the invention, will now be explained in connection with FIG. 6.

Figure 4:
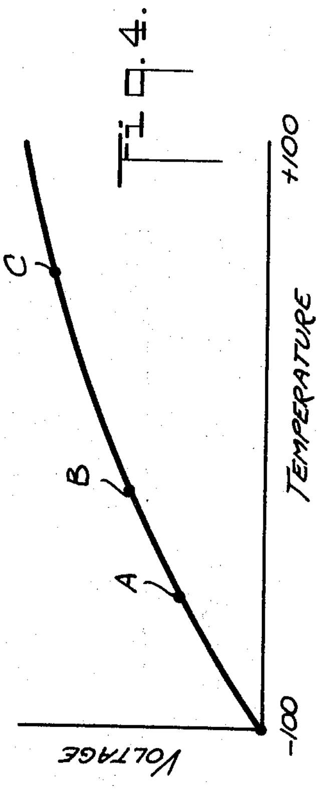
FIG. 4 is a typical voltage-temperature curve of a temperature-to-voltage transducer.
Figures 6, 7, 8, 9:
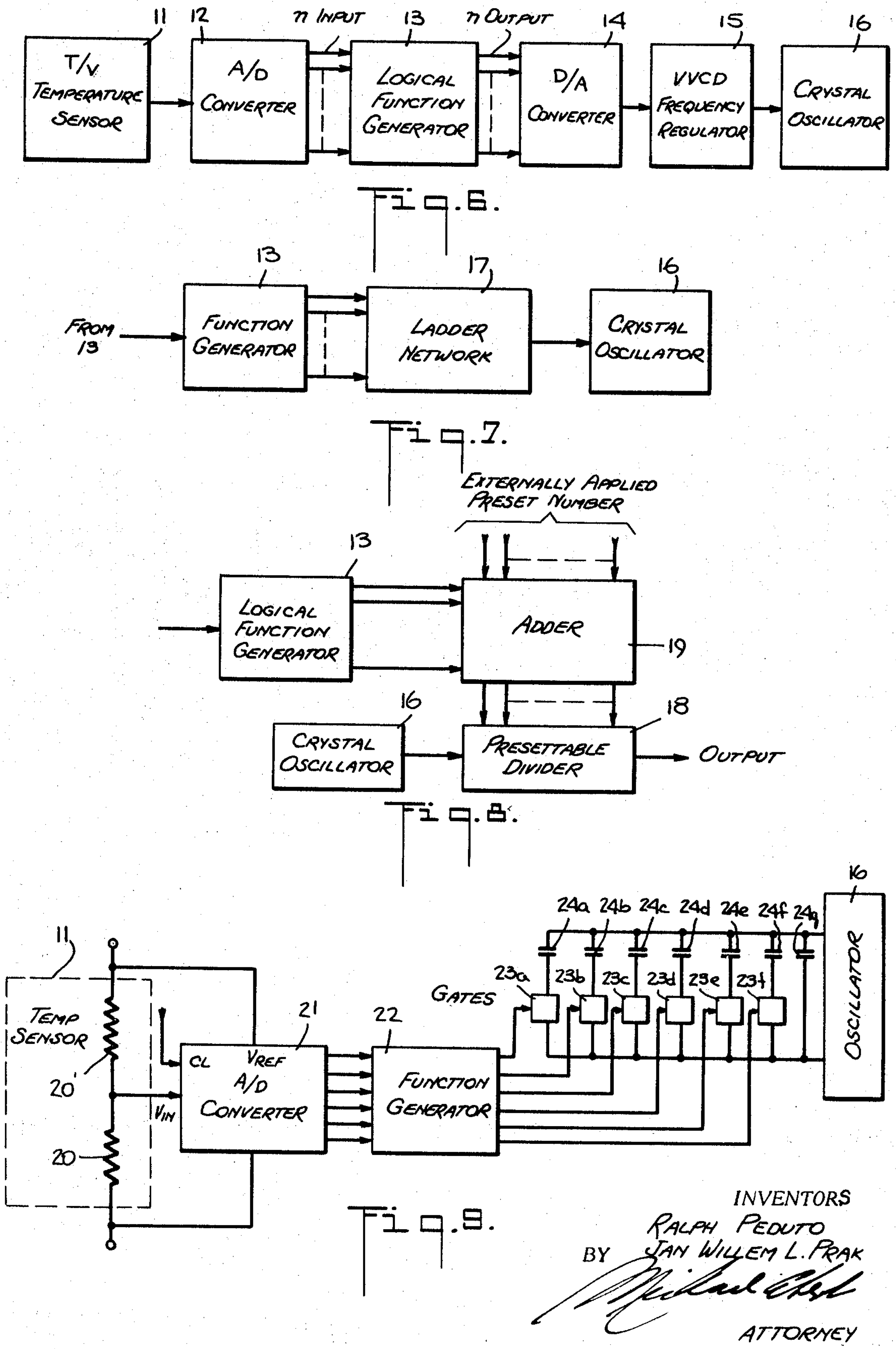
FIG. 6 is a block diagram of one preferred embodiment of a system in accordance with the invention.
FIG. 7 is a block diagram of a first modification of the system.
FIG. 8 is a block diagram of a second modification of the system.
FIG. 9 is a block diagram of another preferred embodiment of a temperature-compensating system, according to the invention.

FIG. 6 shows a temperature-sensing network 11 which may be any known form of transducer (T/V) capable of converting temperature variations in the range of interest, into voltage variations which are a well defined function of the temperature. For this purpose, a thermistor-resistor network, a temperature-sensitive capacitor, or a temperature-sensitive diode may be used. The voltage-temperature curve of the transducer depends on the nature of the transducer or network, and is not related to the frequency-temperature curve of the crystal or whatever electromechanical resonator whose temperature coefficient is being compensated. FIG. 4 shows a typical voltage-temperature curve of a T/V transducer.

The voltage output of network 11 is applied to an analog-digital (A/D) converter 12 of any standard design, adapted to convert an applied analog voltage into a N-bit binary number. The N-bit number is applied as an input to a logical function generator 13 to produce an output N-bit binary number that is a well defined function of the input number.

One preferred embodiment of the function generator is a programmable Read Only Memory (ROM), which can be programmed after the exact characteristics of the temperature sensor, the VVCD and the resonator have been determined. The details of ROM devices are disclosed in the periodical "Electronic Engineer" in the article appearing in the July 1970 issue thereof entitled, "MOS COURSE PART 5B - READ ONLY MEMORY" (Pages 63–69), and in the periodical, "Electronics"for May 10, 1971, in the article, "ROM — CAN BE ELECTRICALLY PROGRAMMED AND REPROGRAMMED AND REPROGRAMMED." (pages 91–95).

Figure 5:
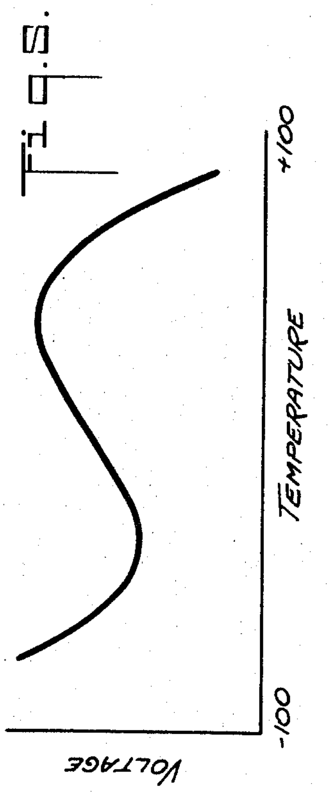
FIG. 5 is a sample of the control voltage curve produced in a temperature-compensating system in accordance with the invention.

The output numbers from function generator 13 are applied to a digital-to-analog converter 14 (D/A) which produces, in response to the applied numbers, a corresponding analog control voltage. Hence yielded in the output of the D/A converter is an analog voltage which is shown in FIG. 5, whose curve depends on the predetermined ROM program.

In this way, the analog measuring voltage from the network 11 in the temperature range of interest, may be transformed into an analog control voltage, which when applied to the voltage-responsive capacitance diode 10 connected in the circuit of a crystal oscillator 16, effects temperature compensation.

Though the input function may be linear, exponential or in any other form, the output function is in no way restricted thereto. If, for example, the crystal oscillator has a quadratic temperature dependence, the function generator may be programmed to convert the input to a quadratic function in order to compensate for the variation of crystal frequency with temperature. And if the crystal frequency temperature dependence characteristic is linear or cubic, these too can be corrected by an appropriate output function.

Thus the system makes it possible to inversely match the frequency-temperature curve of the resonator within the resolution of the digital-analog converter or of the compensating network, as contrasted to a conventional system employing analog temperature compensation, wherein distinct limits are imposed on the types of crystal characteristic curves that one can precisely compensate.

A system in accordance with the invention, as applied to a crystal-controlled timepiece, is capable of maintaining a high degree of crystal stability such that the timing error is less than 0.1 seconds per day. This result is not attainable using an analog-type compensation technique where the available voltage is limited. It will be appreciated that the invention is applicable to any resonator whose frequency is affected by ambient temperature and requires compensation to maintain frequency stability.

In the modified arrangement shown in FIG. 7, the output of function generator 13 is applied to a ladder network 17 formed by a bank of capacitors. The generator in this instance, serves selectively to switch the capacitors in and out so as to introduce into the circuit of crystal oscillator 16, a capacitance value appropriate to ambient temperature.

In other words, where in the case of FIG. 6, the system acts stepwise to vary the voltage which varies the effective capacitance of the VVCD device 10 as a function of temperature, in the FIG. 7 arrangement, at any given level of ambient temperature, the equivalent capacitance is introduced directly by the ladder network. In those crystal oscillator circuits in which the oscillator frequency is sensitive to resistance changes in its circuit, one may use a resistor rather than a capacitor ladder network to obtain compensation.

In the electronic timepiece arrangement shown in FIG. 8, the frequency of crystal-controlled oscillator 16 is divided down by a frequency divider 18 to produce pulses at a repetition rate appropriate for actuating a time-indicating display. Divider 18 may be set by an externally applied preset number for frequency adjustment. The externally applied preset number and the appropriate output of function generator 13 are added electronically in adder stage 19. A preferred embodiment of this arrangement is shown in FIG. 9.

In FIG. 9, the temperature-sensing network is constituted by a high resistance network formed by a fixed resistor 20 and a temperature-sensitive thermistor 20'. The resultant analog measuring voltage developed at the junction of resistor 20 and thermistor 20', is applied to A/D converter 21, which in this instance, is a six-bit converter that operates on a low-duty cycle to conserve power. The output of A/D converter 21 is applied to a read-only memory 22 which decodes the input number in a one-out-of $2^6$ decoder and applies the output number to a 64 × 6 bit array of memory cells to produce a six-bit output.

In this way, a number of crystals possessing different characteristics at which the temperature coefficient is zero, may be served merely by changing the setting of the ROM device 22. The output of the ROM device is applied to six gates, $23_a$, $23_b$, $23_c$, $23_d$, $23_e$ and $23_f$ which act to switch six binary capacitors $24_a$ to $24_f$ in-and-out of the circuit of oscillator 16 which includes a fixed capacitor $24_g$.

The power consumption of the arrangement shown in FIG. 9 may be limited by using high values for resistor 20 and thermistor 20', and by using complementary MOS circuits wherever feasible in the A/D converter 21 and the ROM device 22, as well as in the gates $23_a$ to $23_f$. Also to conserve power, one may use a low-duty cycle for A/D converter 21, which for example, may be rendered operative for only 1 millisecond out of every second.

Temperature-sensing network 11 can also be in the form of a resistor diode network or a network including a temperature-sensitive capacitor. While a crystal resonator has been disclosed in connection with oscillator 16, the time base or frequency standard to be compensated may be in the form of a tuning fork vibrator, a balance wheel oscillator, a vibrating reed or any other form of electromechanical resonator which is temperature-sensitive. The binary function generator can be a direct combinational network having a number of output bits different from the number of input bits.

While there have been shown and described preferred embodiments of temperature-compensating digital systems for electromechanical resonators, in accordance with the invention, it will be appreciated that many changes and modifications may be made therein without, however, departing from the essential spirit of the invention.

We claim:

1. A temperature-compensating system for an electromechanical resonator whose operating frequency depends on ambient temperature, said system comprising:

A. sensor means to produce an analog measuring signal as a function of changes in said ambient temperature, B. an analog-to-digital converter coupled to said sensor means to convert said measuring signal to a corresponding digital value, C. a logical function generator constituted by a programmable read only memory, D. means to apply said digital value as an input to said generator to produce an output digital value, said generator function being programmed to the frequency-temperature characteristic curve of said resonator to provide an inverse match therefor, E. means in circuit with said resonator to effect a shift in the operating frequency thereof, and F. means to apply said output value to said frequency shift means to effect a shift in said operating frequency in a direction and to an extent compensating for the effect of ambient temperature thereon.

2. A system as set forth in claim 1, wherein said resonator is a piezoelectric crystal.

3. A system as set forth in claim 1, wherein said resonator is a tuning fork.

4. A system as set forth in claim 1, wherein said sensor means is constituted by a thermistor network.

5. A system as set forth in claim 1, wherein said sensor means is constituted by a temperature-sensitive capacitor.

6. A system as set forth in claim 1, wherein said sensor means is constituted by a temperature-sensitive diode.

7. A system as set forth in claim 1, wherein said analog-to-digital converter is adapted to produce a binary number whose value corresponds to the applied analog signal.

8. A system as set forth in claim 2, wherein said means in circuit with said crystal is a voltage-responsive capacitance diode.

9. A system as set forth in claim 2, wherein said means in circuit with said crystal is a capacitor network.

10. A system as set forth in claim 2, wherein said means in circuit with said crystal is a resistor network.

11. A system as set forth in claim 8, wherein said means to apply said output value to said voltage-responsive capacitance diode is constituted by a digital-to-analog converter coupled to said frequency generator to produce an analog control voltage which is applied to said diode.

12. A temperature-compensating system for an electromechanical resonator whose operating frequency depends on ambient temperature, said system comprising:

A. sensor means to produce an analog measuring signal as a function of changes in said ambient temperature, B. an analog-to-digital converter coupled to said sensor means to convert said measuring signal to a corresponding digital value, C. a logical function generator, D. means to apply said digital value as an input to said generator to produce an output digital value, said generator function being related to the frequency-temperature characteristic curve of said resonator to provide an inverse match therefor, E. a presettable frequency divider, F. means to apply the output of said resonator to said divider to produce a relatively low frequency output signal, and G. means to apply said output digital value from said function generator to the preset inputs of said divider to compensate said output signal for changes in temperature.

13. A system as set forth in claim 12, further including means to electronically add said output digital value to an external preset number to produce a sum value which is applied to the preset inputs of said divider.

14. A system as set forth in claim 12, wherein said resonator is a piezoelectric crystal.

* * * * *